United States Patent [19]
Haury

[11] Patent Number: 6,128,647
[45] Date of Patent: Oct. 3, 2000

[54] SELF CONFIGURING PEER TO PEER INTER PROCESS MESSAGING SYSTEM

[76] Inventor: Harry R. Haury, 801 Millfield Ct., Chesterfield, Mo. 63017

[21] Appl. No.: 08/832,787

[22] Filed: Apr. 4, 1997

Related U.S. Application Data

[60] Provisional application No. 60/014,887, Apr. 5, 1996.

[51] Int. Cl.⁷ .................................................. G06F 15/16
[52] U.S. Cl. ........................ 709/207; 709/201; 709/206; 709/103
[58] Field of Search ..................... 395/200.31, 200.47, 395/200.53, 200.34, 200.36; 709/201, 202, 204, 205, 206, 207, 230, 238, 243, 246, 248, 103, 104

[56] References Cited

U.S. PATENT DOCUMENTS

| | | | |
|---|---|---|---|
| 5,109,384 | 4/1992 | Tseung | 371/32 |
| 5,276,442 | 1/1994 | Cree et al. | 370/92 |
| 5,408,470 | 4/1995 | Rothrock et al. | 370/62 |
| 5,420,985 | 5/1995 | Cantrell et al. | 395/325 |
| 5,497,463 | 3/1996 | Stein et al. | 395/500 |
| 5,596,749 | 1/1997 | Cantrell et al. | 395/673 |
| 5,682,534 | 10/1997 | Kapoor et al. | 395/684 |
| 5,748,618 | 5/1998 | Rothrock | 370/260 |
| 5,764,902 | 6/1998 | Rothrock | 709/205 |
| 5,838,971 | 11/1998 | Stadler et al. | 395/684 |
| 5,907,704 | 5/1999 | Gudmundson et al. | 395/701 |

*Primary Examiner*—Mehmet B. Geckil
*Attorney, Agent, or Firm*—Senniger, Powers, Leavitt & Roedel

[57] ABSTRACT

The system provides remote program execution, data transport, message communication, status communication and relocation of computer resources by using an arbiter associated with each computer. An originating arbiter of a process resource sends messages between arbiters that are received by each arbiter and then sent to a destination arbiter, if required. If necessary, the message may be retransmitted by intermediate arbiters and eventually received by the destination arbiter which interpret, and executes the message. As a result, the arbiters provide actual communication between the resources. Each arbiter may be resident in each of a plurality of computers which are part of a network linked by a network. Each arbiter independently reviews and processes the messages so that the computers communicate directly with each other on a peer to peer basis without the need for a master controlling program or other gateway for controlling and processing the messages as the messages are transmitted between computers.

20 Claims, 6 Drawing Sheets

Microfiche Appendix Included
(1 Microfiche, 37 Pages)

ALTERNATE MESSAGE STRUCTURES

A   (CONTEXT DEFINED)
     FILENAME = PROCESS IDENTIFICATION
     FILE EXTENSION = CONTROL INSTRUCTION
     FILE CONTENTS = DATA SET AND/OR DATA POINTERS B   (CONTENT DEFINED)
     ANY NUMBER OF LINES IN A ARBITRARY ORDER
     SOURCE ID: (16 BYTES)
     DESTINATION ID: (16 BYTES)
     DATA SET: (AN ARBITRARY NUMBER OF BYTES)
     PROGRAM: (AN ARBITRARY NUMBER OF BYTES)
     SPECIAL INSTRUCTION: (AN ARBITRARY NUMBER OF BYTES); (...);...
     KEYBOARD EXECUTION: (AN ARBITRARY NUMBER OF BYTES)
     CONFIRMATION REQUEST: (1 BYTE)
     RETURN ID: (16 BYTES)
     RETURN DATA SET: (AN ARBITRARY NUMBER OF BYTES)
     RETURN ENCRYPTION LEVEL: (1 BYTE)
     NETWORK CONTROL: (16 BYTES)
     DATE: (AN ARBITRARY NUMBER OF BYTES)
     TIME: (AN ARBITRARY NUMBER OF BYTES)
     SEQUENCE: (16 BYTES)

PING MESSAGE

```
PING
 (NODE ID #1)      ORIGINATING NODE
 (NODE ID #2)      NODES ADDED
 (NODE ID #3)
      .
      .
      .
 (NODE ID #n)
```

FIG. 6

CONTROL MESSAGE

1) TIME:(00:00:00:00)
2) DATE:(xx/xx/xx)
3) RESET:
4) SILENCE:
5) KILL:
6) SHELL:
7) NEW MASTER: (XXXXXXXXXXXXXX)
8) SLAVE MASTER: (XXXXXXXXXXXXXX)
9) NET RESET
10) NET DOWN
11) CHANGE ID: (XXXXXXXXXXXXXX)
12) HELLO
13) REQUEST NEW ID
14) MOVE DATA: (XXXXXX.XXX)
15) MOVE PROGRAM: (XXXXXX.XXX)
16) SEND MAP

SELF CONFIGURING PEER TO PEER
INTER PROCESS MESSAGING SYSTEM

CROSS REFERENCE TO RELATES
APPLICATIONS(S)

This application claims the benefit of U.S. Provisional Application Ser. No. 60/014,887, filed Apr. 5, 1996.

NOTICE

Copyright© 1996 HAURY. A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

REFERENCE TO RELATED APPLICATION

This application contains a microfiche Appendix which contains (1) slide and 37 frames.

BACKGROUND OF THE INVENTION

The traditional limitation of network based inter process messaging and control systems is the incompatibility of the messaging and system control conventions between resources such as various network operating systems and network topologies. With the advent of more ubiquitous networks, significant effort has been expended to enable various operating systems to interact at a basic level by enabling the transfer of data to and from other system environments through the use of compatible data files. The widespread availability of operating system support for data file transfer between incompatible operating environments provides an effective means of automating the transfer of messages and the execution of control instructions between systems that might otherwise be incompatible.

In imaging systems, many vendors have unsuccessfully tried to connect the database directly to the imaging process software across incompatible networks. There is a need for a new operating system independent protocol which does not employ operating system dependent messaging systems such as DDE or OLE and which operates at a higher level so that the protocol deals directly with the process software.

SUMMARY OF THE INVENTION

It is an object of this invention to provide a system and software which allows peer to peer communication and remote process control between processes operating in incompatible operating environments without the need for a master control program.

It is a further object of this invention to provide a messaging protocol which is available to all processes including incompatible processes and which allows each process to read and write files using the protocol.

It is another object of this invention to define a messaging paradigm which is based on file passing technology and which connects various processes through the creation of files.

It is another object of this invention to provide a simple distributed computer environment (SDCE).

It is another object of this invention to provide a computer system that is compatible with a large variety of systems and applications due to the frequency with which other systems can write and copy the text files.

It is another object of this invention to provide a computer system capable of linking incompatible applications and computer systems independent of the computer operating systems being used.

It is another object to provide a system that can move messages and control instructions across an arbitrary number of networks and other connections that allow for the eventual transmission of the messages because of the ease of moving the small ASCII instruction files.

It is still another object of this invention to provide a system which is capable of adding new functions to obsolete and otherwise incompatible legacy systems.

It is another object of this invention to provide an inter-process peer to peer messaging system that can connect any number of processes sequentially or in parallel.

It is an object of this invention to provide an interprocess peer to peer system that uses common virtual or physical disk space on any network with file services to connect resources.

It is an object of this invention to provide an interprocess peer to peer system that allows processes to be stacked by the arbiter so that multiple steps can be performed as a single function, such as read routing, package data and instruction file, encrypt file and copy file.

It is an object of this invention to provide an interprocess peer to peer system that allows processes to be stacked as a result of its intrinsic design and as a result of it being able to execute processes by the arbiter.

In one form, the invention comprises a network system comprising a plurality of resources, some of which being incompatible with others, a network interconnecting the resources and an arbiter resident in each of the resources. The arbiter sends messages via the network and receiving messages via the network. Each arbiter independently reviews and processes the messages from other arbiters of other resources so that the resources communicate directly with each other without the need for a master controlling program and without the need for other gateway for controlling and processing the messages as the messages are transmitted between resources.

In another form, the invention comprises a message system for transmitting messages on a network between resources interconnected by the network. An arbiter resident in each of the resources sends messages via the network and receives messages via the network, each said arbiter independently reviewing and processing the messages so that the resources communicate directly with each other. As a result, there is no need for a master controlling program or need for other gateway for controlling and processing the messages as the messages are transmitted between resources.

In another form, the invention comprises an inter process peer to peer messaging system for communicating between a plurality of networked resources, some of which employ operating systems which are incompatible with each other. An arbiter message originator associated with each of the resources provides an arbiter message to be sent to the other resources, the arbiter message instructing one of the other resources to execute one or more of the following: remote program execution, data transport, message communication, status communication and relocation of computer resources. A message arbiter receiver associated with each resource receives the arbiter messages from the other resources and responds to the received arbiter message by executing one or more of the following: retransmitting the arbiter message to another one of the resources; and interpreting and executing the received arbiter message wherein the arbiter message originator and the arbiter message receiver do the actual communication between their respective resources without the need for a master controlling program and without the need for other gateway for controlling and processing the messages as the messages are transmitted between resources.

In another form, the invention comprises an inter process peer to peer messaging process for communicating between a plurality of networked resources, some of which employ operating systems which are incompatible with each other. The process comprising the steps of:

transmitting an arbiter message from one resource to the other resources, the arbiter message instructing one of the other resources to execute one or more of the following: remote program execution, data transport, message communication, status communication and relocation of computer resources; and receiving the arbiter messages from the other resources and for responding to the received arbiter message by executing one or more of the following: retransmitting the arbiter message to another one of the resources; and interpreting and executing the received arbiter message wherein the actual communication between their respective resources is accomplished without the need for a master controlling program and without the need for other gateway for controlling and processing the messages as the messages are transmitted between resources.

Other objects and features will be in part apparent and in part pointed out hereinafter.

BRIEF DESCRIPTION OF THE DRAWINGS

Corresponding reference characters indicate corresponding parts throughout the drawings.

BRIEF DESCRIPTION OF THE APPENDIX

Appendix A, figure 1A illustrates source code for an identity file.

Appendix A, figure 2A illustrates source code for a multi-step communication configuration requiring multiple message files to complete the instruction sequence.

Appendix A, figure 3A illustrates source code for implementing an arbiter process based on contextual file content.

Appendix A, figure 3B illustrates source code for implementing an arbiter process based on contentual file content.

Appendix A, figure 4A illustrates a source code program listing in Visual basic of a message replicating arbiter that uses fixed routing to move messages from one scratch space to another.

DETAILED DESCRIPTION OF THE INVENTION

The system of the invention uses a structured process for object and token passing with an ability to dynamically build network routes between processes resident on different or the same computer, i.e., peer to peer. The processes may be compatible, partially compatible or incompatible. The invention enables the directed transfer of message files from one process to another process without having to have the originating process know the location of another process in a heterogeneous networking environment; the messages are transferred between process names not locations. The use of independent network arbiter agents, one at each resource or group of resources, to copy and interpret control files allows for a very sophisticated remote peer to peer and/or process to process communications and control. The use of a file based message paradigm according to the invention rather than a set of memory or operating system based variables, provides for much greater flexibility to connect otherwise incompatible systems than would be allowed by other network operating system or process specific messaging systems. The simplicity of writing files of the invention also makes it much more convenient to incorporate this inter-process communication and control into a network of separate systems developed in incompatible operating environments. This is due to the ease with which the messages can be copied between the source and target systems. The use of the file based messaging system of the invention also allows obsolete legacy systems to communicate across a system with minimal programming.

The invention comprises means for automatically sending data, messages, and control instructions between processes operating in a single computer or across a complex heterogeneous network environment. The system was designed to write, optionally encrypt, copy, transmit, interpret and execute instructions, and move data based on instructions contained in small, simple to create files. Each process sends messages to an arbiter which has a resource list of all objects which can be executed. Arbiters may be general purpose or have a specific function such as a replicator arbiter or one-sided (end node) arbiter.

In general, an arbiter according to the invention is an independent process which reviews a message including instructions and processes the instructions of the message when the arbiter determines that the message has a token or address which matches the address of the resource with which it is associated or resident. Traditionally, network messaging systems have a master control program (MCP) for controlling messages between resources connected to the network. For example, centralized e-mail would be such a system. All messages passed through the master control program which acts as a gate keeper for maintaining timing, routing and compatibility. Therefore, the master control program is necessary to allow communication between resources. The invention uses arbiters which avoid the need for such intervention by a master control program and essentially avoid the need for a gate keeper. Arbiters communicate with each other by reading and writing the messages to designated scratch spaces.

In general, traditional networks reach a point of difficulty adding additional users or resources because of their complexity and the concentrated loading which occurs as additional users or resources increase. On the other hand, the invention allows the addition of resources without any increase in complexity. An additional resource may be added simply by providing a unique address to it and by having an arbiter which is able to determine or otherwise know its address. All other arbiters would then be advised of the new address of that resource in order to be able to communicate with the resource. In other words, the arbiters of the invention provide a gateway function between resources without the need for intervention of the type that the master control program requires.

Figure 3:
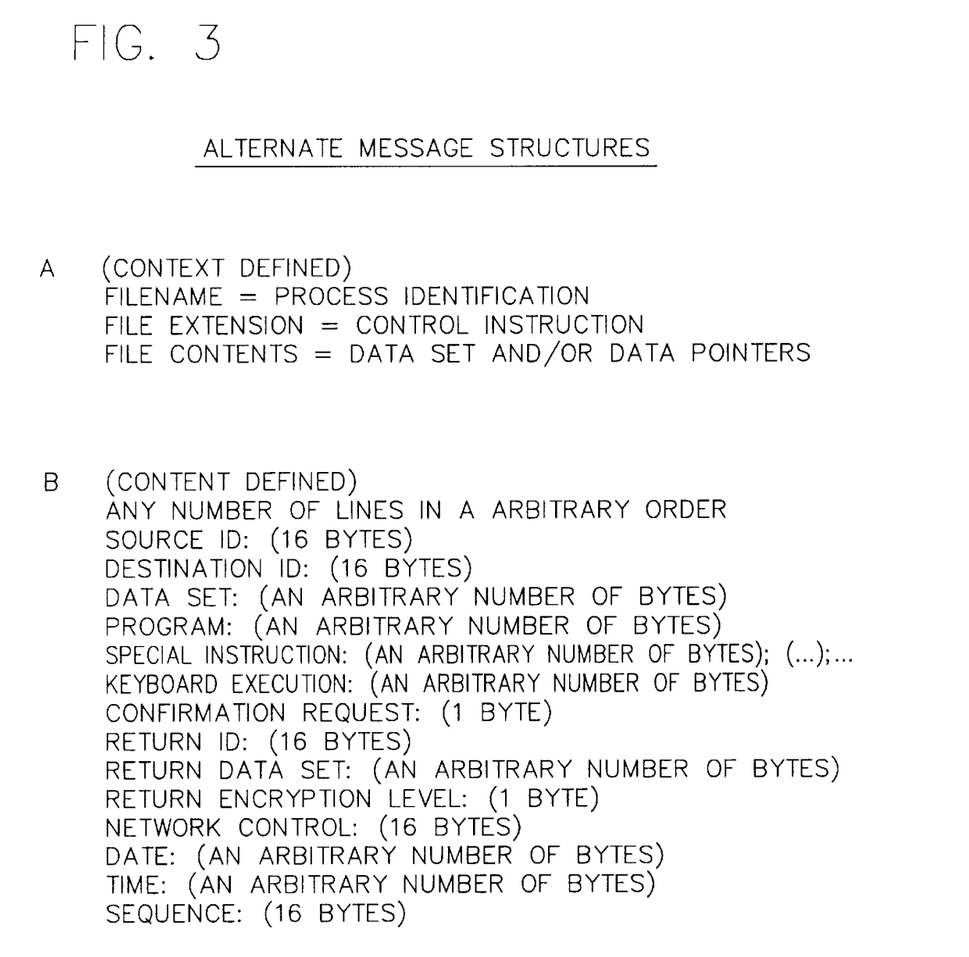
FIG. 3 illustrates the basic content of context defined and content defined messages transferred between different, incompatible applications which are linked by the inter process messaging system according to one preferred embodiment of the invention.

The message file from an originating arbiter acts as a token which identifies which process is in control of an arbiter at any particular time. The token also controls permission to read and execute the file. In other words, the message functions as a token that passes control between particular arbiters. First, the destination arbiter verifies that the token is part of a valid message and then the destination arbiter gives this message control by allowing the instructions associated with the token to take exclusive control of the destination arbiter. When a destination arbiter receives a message or token, it temporarily turns its message receiving subsystem off so that it does not receive other conflicting messages or tokens. After completing the analysis and/or execution of a message, the destination arbiter then is ready for the next message. The token is part of a larger message which includes logic embedded therein which instructs the destination arbiter to operate in a particular way and utilize the appropriate resources. In other words, the message is a structured object and can have two forms: contextually defined messages and content messages as illustrated in FIG. 3. Contextually defined messages include content messages but also include inferred instructions interpreted from the message name. The content message includes lines of code which define a particular action and the way to execute it. The message, including a token, may be considered a virtual file. The name of the contextually defined message is essentially the definition of the destination of the message. The extension name defines the action to be taken.

In one preferred embodiment of the invention, the invention may include a multi-step communication configuration requiring multiple message files to complete the instruction sequence. An example can be seen as implemented as part of the source code included herewith. For example, see figure 2A, beginning at line 15.

One unique feature of the invention is that it is not specific to a particular operating system but provides a messaging paradigm which can be used with any type of operating system. As a result, the invention may be used to allow a mainframe to communicate with a desktop without the need for a master control program. In general, the system of the invention allows an interface between different, incompatible systems. For example, the invention has been used to allow a mainframe to drive a Windows program on a desktop computer without the need for DDE or OLE messaging systems, which are specific to the Windows operating system, to be resident in the mainframe.

In one aspect of the invention, the system of the invention may be used to allow imaging between incompatible systems. For example, a Sun computer may scan a document and then provide a message to a PC which can then access the scanned document and print it. Most, if not all systems, can read and write ASCII text files, so that it becomes clear that it is easily possible to configure a network of incompatible computers which can access each other's ASCII files by using the arbiter of the invention. Such a system would not require a translator or other master control program which would tend to complicate and slow down the communication between programs.

As noted above and illustrated in FIG. 7, it is also contemplated that encryption may be used so that each message is encrypted to further enhance the security features of the network.

In summary, the invention comprises a network comprising a plurality of resources or applications, some of which being incompatible with others. The network interconnecting the resources. An arbiter resident in each of the resources sends messages as a message originator via the network and receives messages as a message arbiter 106 via the network wherein each arbiter independently reviews and processes the messages from other arbiters of other resources so that the resources communicate directly with each other without the need for a master controlling program and without the need for other gateway for controlling and processing the messages as the messages are transmitted between resources. The network includes a distributed computing environment interconnecting systems using different operating systems and networking systems and wherein the arbiter message comprises ASCII text files as illustrated in FIG. 3 for the transmission of instructions between resources. In particular, the arbiter message comprises independent task arbiters 100, 106 operating across the network that can dynamically interact with other task arbiters without the need for a central master control system. The independent task arbiters are independent network agents acting under the sole control of the messages being received. The resources communicate directly with other resources via the independent task arbiters without the intervention of any other process. The independent message arbiters provide asynchronous messaging between resources of the network so that each generated message is transmitted through the network independent of any other messages and the transmitted message will be acted on as it is received by the destination resource. The originating resource executes other tasks after transmitting the message arbiter thereby creating an intrinsically multi-tasking and multi-threaded control system such that multiple arbiter messages can be transmitted through the network independently between multiple resources. The destination arbiter determines whether any necessary data or programs are available for executing the controlled process and writes a control file instructing other network arbiters to transmit the necessary data or programs to the destination arbiter when the destination arbiter determines that the necessary data or programs are not available. Each arbiter employs messages which may be encrypted so that the network is substantially secure.

The arbiter messages include text interconnecting resources across a network or interconnecting resources within a single computer. Each resource processes the arbiter messages in its background while performing other functions in its foreground. Adding other computer program functions is accomplished by executing arbiter instruction files in the background so that programs that provide additional functions can be executed by other resources that can write the instruction files whereby this execution can be so tightly bound that the executed programs appear to be part of the originating program. Data and software are remotely distributed by directly controlling linked computer systems so that executed programs can do such things as copy files to remote locations. The network may handle time independent instructions and the arbiters may be programmed to execute only at certain times and the programs themselves can be programmed to execute at specific times or intervals by the resources whereby network traffic can be controlled to minimize traffic volume or processor requirements at particular times. The arbiter includes a message replicating arbiter that uses fixed routing to move messages from one scratch space to another.

In another form, the invention comprises a message system for transmitting messages on a network between resources interconnected by the network. An arbiter resident in each of the resources sends messages via the network and receives messages via the network, each said arbiter independently reviewing and processing the messages so that the resources communicate directly with each other. As a result, there is no need for a master controlling program or need for other gateway for controlling and processing the messages as the messages are transmitted between resources.

In another form, the invention comprises an inter process peer to peer messaging system for communicating between a plurality of networked resources, some of which employ operating systems which are incompatible with each other. An arbiter message originator associated with each of the resources provides an arbiter message to be sent to the other resources, the arbiter message instructing one of the other resources to execute one or more of the following: remote program execution, data transport, message communication, status communication and relocation of computer resources. A message arbiter receiver associated with each resource receives the arbiter messages from the other resources and responds to the received arbiter message by executing one or more of the following: retransmitting the arbiter message to another one of the resources; and interpreting and executing the received arbiter message wherein the arbiter message originator and the arbiter message receiver do the actual communication between their respective resources without the need for a master controlling program and without the need for other gateway for controlling and processing the messages as the messages are transmitted between resources.

In another form, the invention comprises an inter process peer to peer messaging process for communicating between a plurality of networked resources, some of which employ operating systems which are incompatible with each other. The process comprising the steps of:

transmitting an arbiter message from one resource to the other resources, the arbiter message instructing one of the other resources to execute one or more of the following: remote program execution, data transport, message communication, status communication and relocation of computer resources; and receiving the arbiter messages from the other resources and for responding to the received arbiter message by executing one or more of the following: retransmitting the arbiter message to another one of the resources; and interpreting and executing the received arbiter message wherein the actual communication between their respective resources is accomplished without the need for a master controlling program and without the need for other gateway for controlling and processing the messages as the messages are transmitted between resources.

Preferably, the process of the invention includes resources which originate messages of simple ASCII text files and wherein the resources identify the system identity of messages from the text file. The text files may contain a digital signature such as illustrated at line 12 of Appendix A to prevent unauthorized tampering and/or to verify the message source.

CODING DETAILS

No particular programming language, computer system, or network operating system have been indicated for carrying out the various procedures described above. This is in fact due to the broad applicability of this invention to many computer languages, computer systems and network operating systems. Computers which may be used in practicing the invention are diverse and numerous. It is considered that the operations and procedures described as part of the invention are sufficiently disclosed to permit one of ordinary skill in the art to practice the instant invention. One preferred embodiment of implementation of the invention in Visual Basic source code is found below as Appendix A.

DESCRIPTION OF PREFERRED EMBODIMENTS ILLUSTRATED IN THE FIGURES

Figure 1:
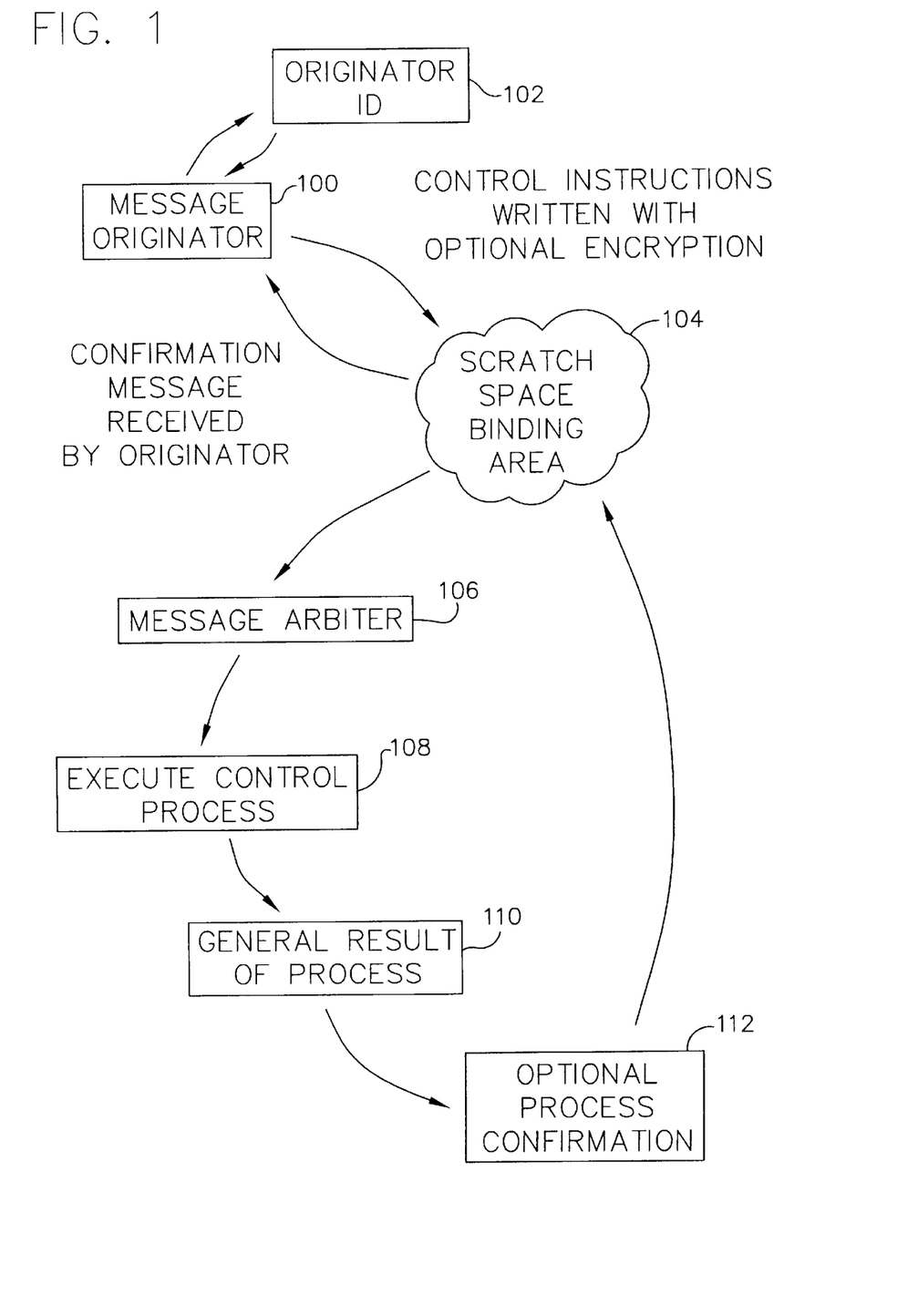
FIG. 1 is a logic diagram of the inter process messaging system according to one preferred embodiment of the invention.

FIG. 1 shows a diagram that demonstrates the basic logic of the inter process messaging system embodied by the invention. The process originating the message first configures its identity by reading its local identity file. In particular, a resource employs a message originator 100 to read an originator ID 102. The identity file establishes several defaults for communication, the name of the process, and the location of the scratch space (e.g., RAM disk) to which the process is bound. The originating process writes its message files (described below) which contain its control instructions written with optional encryption in a local storage area that is set in the identity file and is known as a scratch space binding area 104. This area can be used by multiple processes to send messages back and forth. A special process called a message arbiter 106 monitors this scratch space binding area for each new instruction file. When a new file is written, all arbiters monitoring this scratch space read it including a destination arbiter which is identified by the file. After the destination arbiter reads it, the destination arbiter recognizes the file as including the destination arbiter's address or token. As a result, the destination arbiter interprets what should be done and executes the instructions contained within the file. In FIG. 1, message arbiter 106 executes a control process. The instructions may consist of one or more of the following: message replication in at least one other scratch space, execution of instructions, launching of new processes, erasing old message files, or requesting that programs or data be copied so that they may be used or analyzed. The process is inherently asynchronous and, without direct connection between processes, the network of arbiters handle message transmission and instruction execution. However, synchronous type behavior can be programmed into the system by providing for a general result of the process 110 and an optional process confirmation 112 so that execution and error conditions are returned to the original process. An example identity file is contained in FIG. 1A of Appendix A. Code demonstrating the writing of a message file and confirming instruction file as it would be written by a process using the messaging system is demonstrated in Figure 2A of Appendix A, beginning at line 21.

Figure 2:
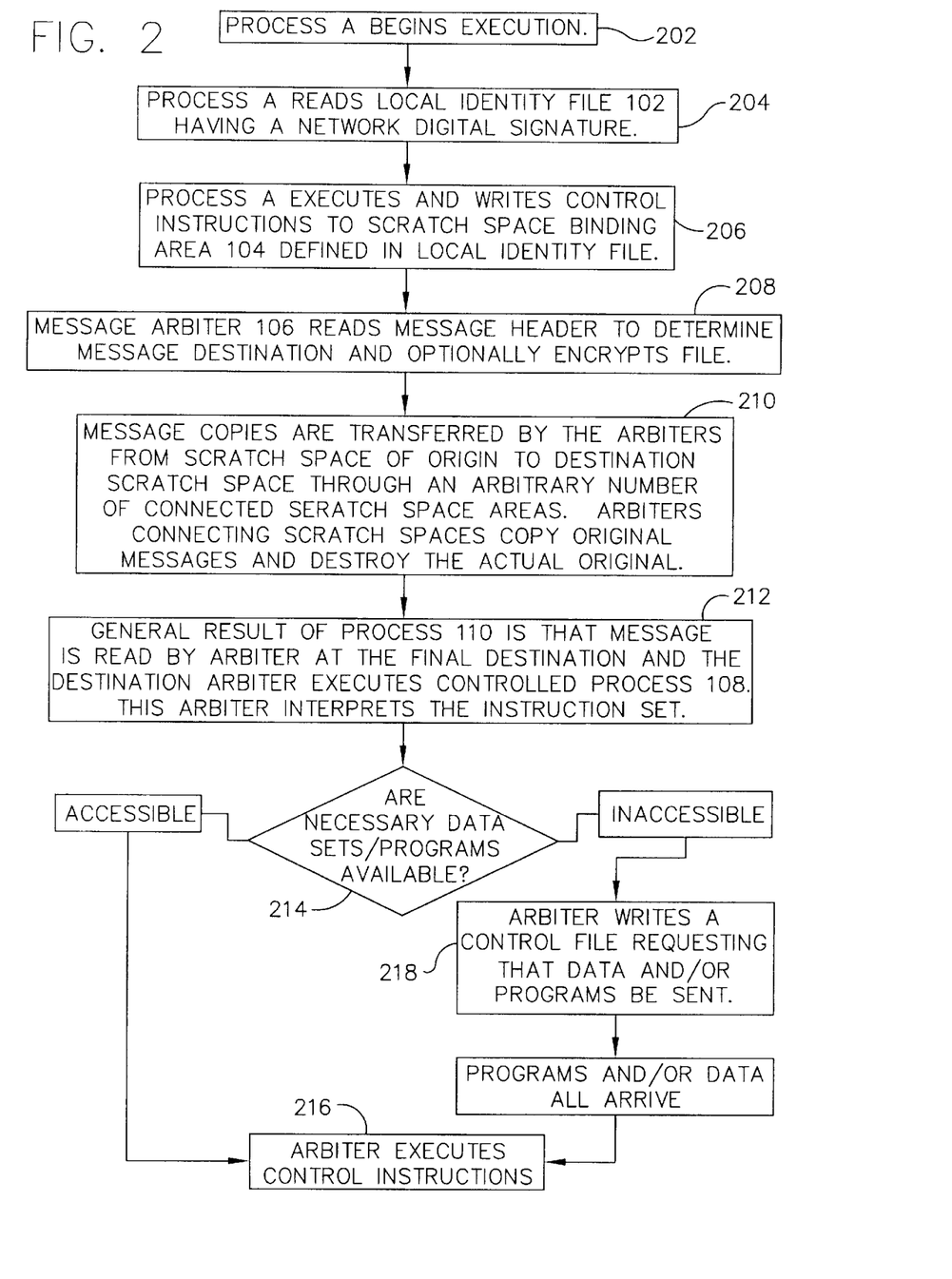
FIG. 2 is a flow chart of the logic steps performed by an arbiter of the inter process messaging and control system according to one preferred embodiment of the invention. Appendix A is a Visual Basic source code listing of the arbiter of the invention.

FIG. 2 describes the logic embedded in the invention to process and interpret these message files. By transferring and executing messages on a peer to peer basis, the invention can be used to distribute data and software, remotely execute programs and procedures, link heterogeneous systems, display images, play multimedia and sound clips, and develop distributed computing applications. Process A is the message originator 100 which may be any external process (e.g., database application or spreadsheet) that will communicate with another external process (control process 108) via the arbiter. Process A begins execution of itself at step 202. At step 204, process A reads its local identity file 102. At step 206, process A writes control instructions for the message arbiter 106 of controlled process 108. These instructions are written to the scratch space binding area 104 defined in the local identity file which is the originator ID 102 of the message originator 100. At step 208, the message arbiter 106 reads the message header in the binding area 104 to determine the controlled process 108 to which the message will be sent. Optionally, the message may be encrypted. At step 210, message copies are transferred by the arbiters from the scratch space of origin to the destination scratch space through an arbitrary number of connected scratch space areas. Arbiters connecting scratch spaces copy original messages and destroy the actual original. At step 212, the arbiter executes the controlled process 108. In particular, the general result of process 110 is that the message is read by the destination arbiter which executes the controlled process. This final destination arbiter interprets the instruction set. The destination arbiter also determines if required data and programs are inaccessible to the destination process. In particular, at step 214, the destination arbiter determines whether the data sets and programs necessary to execute the controlled process are available. If the necessary data sets and programs are available, the destination arbiter proceeds to step 216 and executes the controlled process. If the necessary data sets and programs are not available, the destination arbiter proceeds to step 218 and writes a control file requesting the data and/or programs needed for executing the controlled process. After the data sets or programs arrive at step 220, the destination arbiter proceeds to step 216 and executes the controlled process. In summary, the destination arbiter determines whether any necessary data or programs are available for executing the controlled process and writes a control file instructing other network arbiters to transmit the necessary data or programs to the destination arbiter when the destination arbiter determines that the necessary data or programs are not available.

FIG. 3 describes the basic content of the messages using two different implementations of the invention. Context defined messages (A) are easy to construct and control but they do not have the flexibility and power of the content defined messages (B). The content defined messages (B) must at a minimum have a source ID which identifies the originating process and a destination ID that tells where the message is to be sent. Data set and program lines in the message file identify the data and programs needed to execute the instructions. Special instructions are programs that have been given registered aliases to simplify using them. Keyboard execution provides a means of sending keystrokes to an application that is launched by the arbiter. Confirmation request instructs the destination arbiter to send two messages back to the originating arbiter; message received and a message regarding the success of program execution when the launched programs are finished running.

An example of code implementing an arbiter process based on contextual file content is contained in Figure 3A of Appendix A, beginning at line 72. Figure 3A demonstrates the contents of a context defined message file. The destination arbiter is defined by the filename. The controlled process is defined by the file extension. The data sets to be used by the controlled process are defined by file contents.

Figure 3B also demonstrates the contents of a content defined message file. An example of a code routine implementing an arbiter process based on contentual file content is contained in Figure 3B of Appendix A, beginning at line 374. This content code routine reads and executes content defined messages and is used as an alternate to the context code routine in Figure 3A of Appendix A for reading context defined messages. In other words, the content code routine of Figure 3B of Appendix A executes content based instruction files whereas the context code routine of Figure 3A of Appendix A executes context based instruction files. The system determines whether the instruction files are content or context based and applies the appropriate routine. The destination arbiter is defined by the filename. The order to the lines in not critical. The line beginning "Source ID:" specifies the identity of the process that originated the message. The line beginning "Destination ID:" specifies the identity of the destination arbiter. Any line(s) beginning "Data Set:" specifies the file(s) that contain the data necessary to execute the controlled process. Anyn line(s) beginning "Program:" specifies the controlled process program(s) to be executed. Any line(s) beginning "Special Instructions:" specifies any special instructions required for the control process command line. Any line(s) beginning "Keyboard Execution:" specifies redirected key inputs when the arbiter acts as a keyboard robot for the controlled process. A line beginning "Confirmation Request:" specifies whether the controlled process is to send an acknowledgement message of the its execution of the message to the controlled process. A line beginning "Return ID:" specifies the identity of a secondary destination arbiter to which the output of the controlled process will be sent. A line beginning "Return Data Set:" specifies the file that will contain the output of the controlled process. A line beginning "Return Encryption Level:" specifies the type of security to be implemented in the return message, if any. A line beginning "Network Control:" specifies one or more of the following: the public key of the arbiter or process originating the message; the type of security implemented by the originating arbiter or program; and/or miscellaneous header information. The Date and Time lines specify date and time of the original message. The line beginning with "Sequence Number:" specifies an arbitrary index identifying the order in which messages were originated by the a specific process or arbiter so multiple messages can be sent by a particular process or arbiter to another process or arbiter without ambiguity of order.

Figure 4:
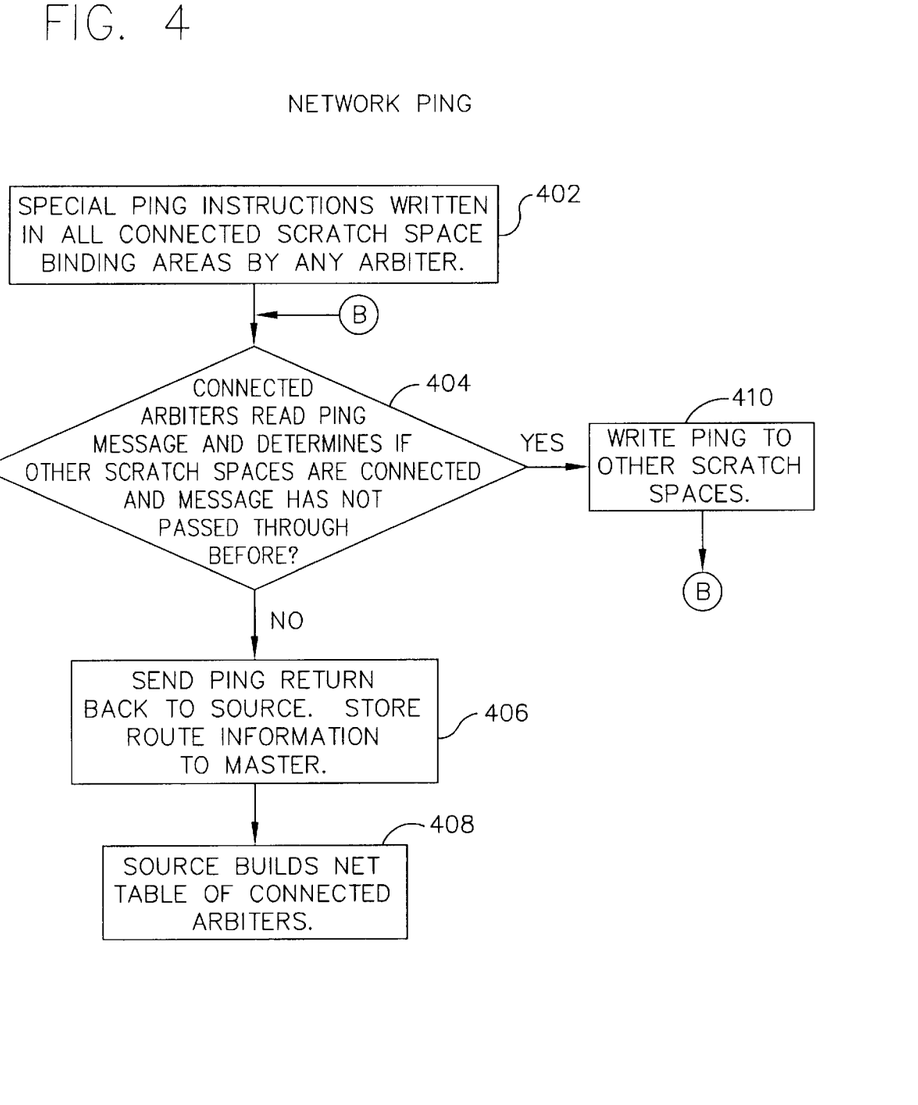
FIG. 4 describes in detail the mechanism used by the master routing arbiter and any other arbiters to dynamically build routing tables in order to determine how to move a control message from one process to another. An example of an arbiter that uses fixed routing to move messages from one scratch space to another is contained in Figure 4A of Appendix A.

FIG. 4 describes in detail the mechanism used by a routing arbiter and any other arbiter to dynamically build routing tables in order to determine how an originating arbiter moves a control message from an originating process through various routing arbiters to a destination arbiter associated with the destination process. An example of an arbiter that uses fixed routing to move messages from one scratch space to another is contained in Figure 4A of Appendix A, beginning at line 626. Initially, at step 402, special ping instructions are written in all connected scratch space binding areas 104 by the routing arbiter. Decision block 404 represents a step or series of steps to confirm that all connected arbiters have read the ping message. These steps also determine if other scratch spaces are connected. If spaces are identified through which the ping message has not passed through before, the process proceeds to step 406 wherein the ping message is written to the other scratch spaces. The process then returns to decision block 402. If no spaces are identified so that all have received the ping message, the process proceeds to step 408 wherein a ping return message is sent back to the routing arbiter by the receiving arbiter and the receiving arbiter stores the route information to its master file. Finally, at step 410, the routing arbiter or source builds net tables of connected arbiters to continue with the actual transfer of instruction files.

Figure 5:
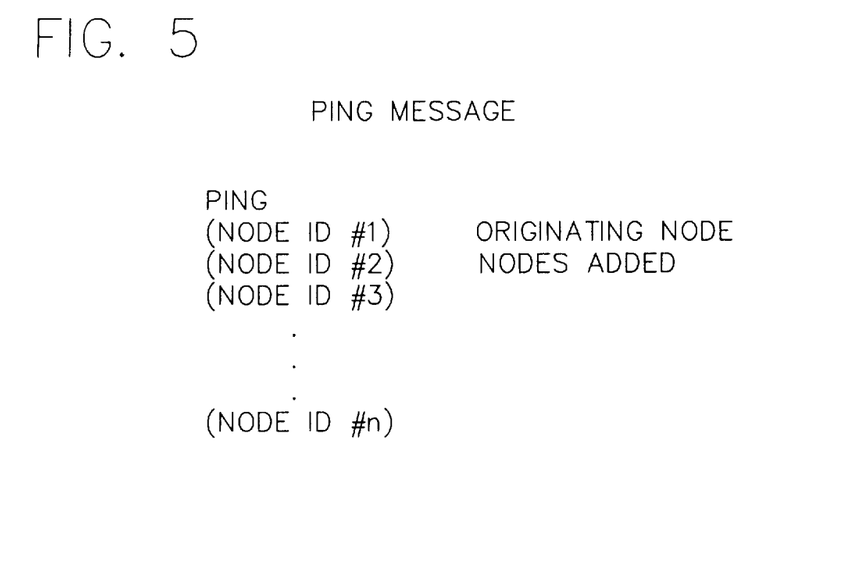
FIG. 5 describes the nature of the Ping message that initially is sent to all locations and is used to establish routing on the network. The Ping message content is fully explained in this figure. After receipt of the Ping message, each arbiter sends out its own unique table identifying itself and the originating resource sending the Ping message takes an inventory of all the arbiters which send out tables in response to the Ping message.

FIG. 5 describes the nature of the Ping message that is used to establish routing on the network as described in FIG. 4. The Ping message content is fully explained in this figure.

Figure 6:
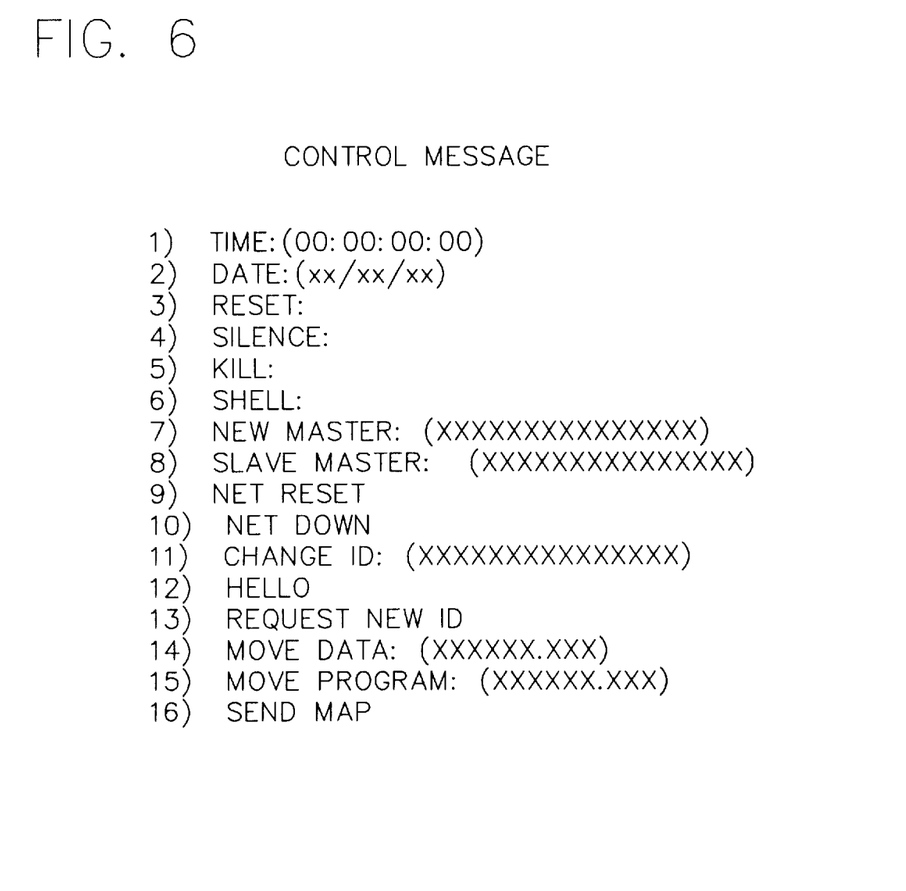
FIG. 6 describes a number of special pre-registered instructions for network commands that are directly executed by the arbiter. Contextual arbiters use fixed pre-registered commands. An example of such an arbiter is contained in FIG. 3A of Appendix A.

FIG. 6 describes a number of special pre-registered instructions for network commands that are directly executed by the arbiter. Contextual arbiters use fixed pre-registered commands. An example of such an arbiter is contained in Figure 3A of Appendix A, beginning at line 72.

There are five layers of message encryption used to protect network security: 1) none; 2) message check digits using originating process digital signature (DS); 3) encryption of whole message using destination ID and originating process; 4) encryption of instructions using destination ID and originating process; and 5) encryption based on destination public key. Optionally, the message can be left as unencrypted ASCII; the message can be given a set of check digits using the originators identity as an encryption key; the message can be encrypted using the network digital signature (DS); the body of the message can be encrypted using the destination's digital signature and the originator's digital signature; and the message can be encrypted using only the destinations public key. The encryption processes are arbitrary in nature and can use such techniques as digital signature, public and private key encryption. An example of these algorithms would be the licensed RSA encryption techniques.

Figure 7:
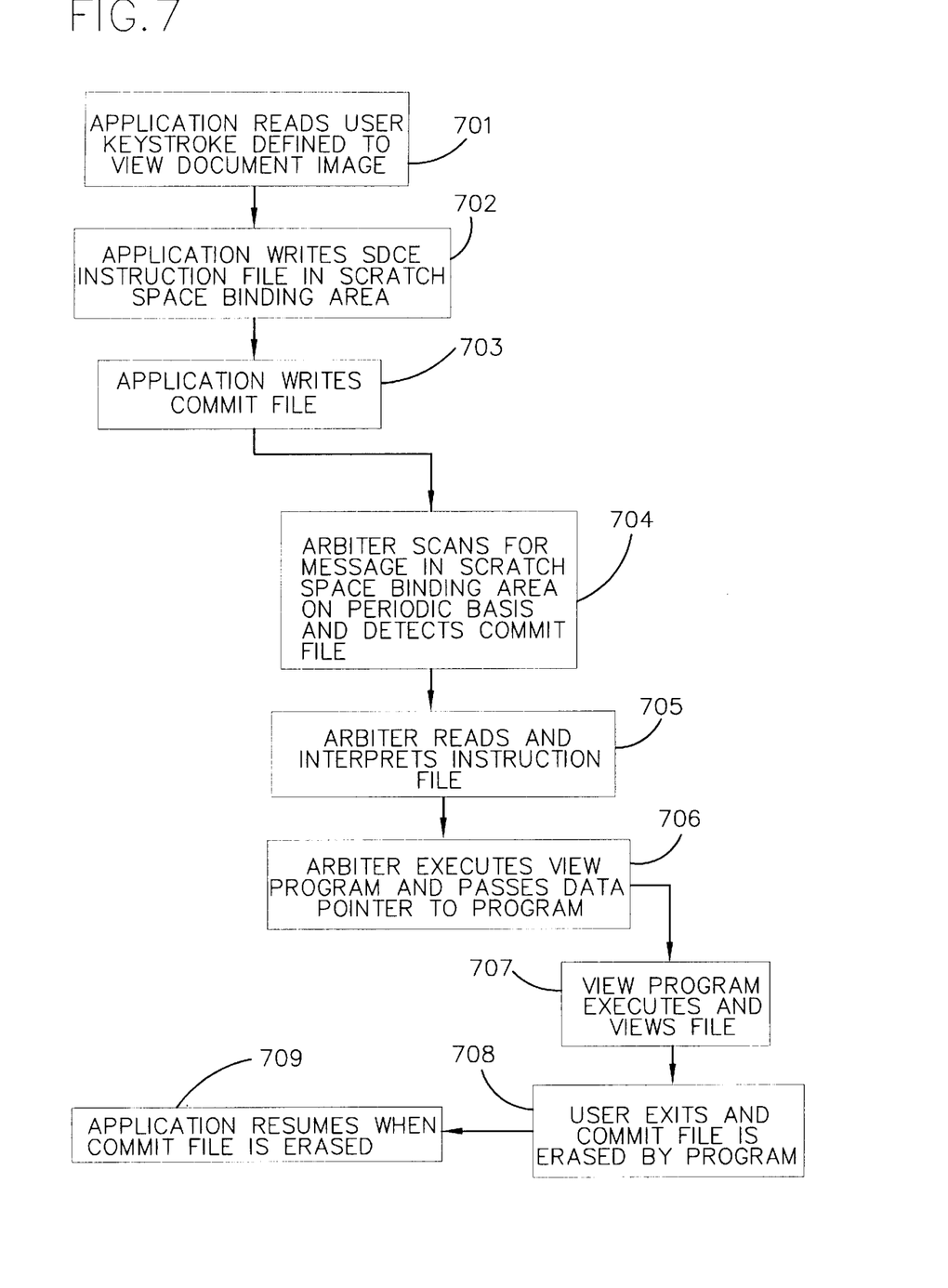
FIG. 7 is a functional block diagram illustrating an image enabling process according to the invention on a stand alone personal computer using a context defined simplified distributed computing environment (SDCE) and a local arbiter.

FIG. 7 is a functional block diagram illustrating an image enabling process according to the invention on a stand alone personal computer using a context defined simplified distributed computing environment (SDCE) message and a local arbiter. In general, FIG. 7 illustrates the use of a text file via an arbiter to control a process such as imaging or file viewing. The application may be any application such as a database program running on the personal computer. At step 701, the application reads a user keystroke which has been defined to execute the function of viewing a document image. At step 702, the application writes an SDCE instruction file to the scratch space binding area 104. The instruction file is a text file including instruction data such as the file identifier of the file to be imaged. In this case, the instruction sequence also includes a commit file which instructs the arbiter to start the controlled process. At step 703, the application writes the commit file. These first three steps are executed by the application.

The next three steps are executed by the arbiter of the stand alone PC which functions as both the originating arbiter and the destination arbiter in a stand alone system. At step 704, the arbiter scans for a message in the scratch space binding area on a periodic basis and detects the commit file written by step 703. Next, at step 705, the arbiter reads and interprets the instruction file associated with the detected commit file. At step 706, the arbiter executes a view program routine (the controlled process) in response to the detected instructions and passes a data pointer which is part of the instruction file to the view program routine. At step 707, the controlled process, i.e., the view program routine, executes and views the file. At step 708, the user exits and the commit file is erased by the program. At step 709, the application resumes as a result of the commit file being erased.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

I claim:

1. A network system comprising:
   a plurality of resources, some of which being incompatible with others;
   a network interconnecting the resources;
   a plurality of asynchronous peer-to-peer arbiters, each resident in one of the resources for sending arbiter messages to other arbiters of other resources via the network asynchronously peer-to-peer and for receiving arbiter messages from other arbiters of other resources via the network asynchronously peer-to-peer wherein each arbiter reviews and processes the messages independently from other arbiters of other resources so that the resources communicate directly with each other via the arbiters without the need for a central master control system including controlling logic, a state control object, or a message locking system and without the need for a gateway for controlling and processing the messages as the messages are transmitted between resources;
   wherein the arbiters include independent task arbiters operating across the network, said independent task arbiters including destination arbiters which receive arbiter messages addressed to them, which determine whether any necessary data or programs are available for executing a controlled process in the received message and which execute the controlled process in the received message when any necessary data or programs are available.

2. A network system of claim 1 wherein the network includes a distributed computing environment interconnecting systems using different operating systems and networking systems and wherein the arbiter message comprises ASCII text files for the transmission of instructions between resources via their arbiters.

3. A system of claim 2 wherein the independent task arbiters dynamically interact with other task arbiters without the need for a central master control system, wherein said independent task arbiters are independent network agents acting under the control of the messages being received, and wherein said resources communicate directly with other resources via the independent task arbiters without the intervention of any other process.

4. A system of claim 3 wherein the independent message arbiters provide asynchronous messaging between resources of the network so that each arbiter message generated by one of the independent message arbiters is transmitted through the network independent of any other messages and the transmitted message will be acted on as it is received by the arbiter of the destination resource.

5. A system of claim 4 further comprising originating arbiters which originate the sending of arbiter messages and which execute other tasks after transmitting the messages thereby creating an intrinsically multi-tasking and multi-threaded control system such that multiple arbiter messages can be transmitted through the network independently between the arbiters of multiple resources.

6. A system of claim 3 wherein said destination arbiters write a control file instructing other network arbiters to transmit necessary data or programs to the destination arbiter when the destination arbiter determines that the necessary data or programs are not available.

7. A system of claim 2 wherein each arbiter employs messages which are encrypted after creation by its associated resource so that the network is substantially secure.

8. A system of claim 2 wherein the arbiter messages include text that provide instructions for interconnecting resources across the network or for interconnecting resources within a single computer.

9. A system of claim 2 wherein each resource processes the received arbiter messages in its background while performing other functions in its foreground.

10. A system of claim 9 wherein adding other computer program functions to a resource is accomplished by executing arbiter instruction files in its background so that programs that provide additional functions can be executed by the arbiter of the resource by writing the instruction files whereby this execution can be so tightly bound that the executed programs appear to be part of the originating program.

11. A system of claim 2 wherein the arbiters provide for the remote distribution of data and software by directly controlling linked resources so that programs executed by the linked resources copy files to remote locations and combine data files and/or program files with execution instructions necessary to process the data files and/or program files.

12. A system of claim 2 wherein the network handles time independent instructions and wherein the arbiters are programmed to execute only at certain times and wherein programs of the resources are programmed to execute at specific times or intervals whereby network traffic can be controlled to minimize traffic volume or processor requirements at particular times.

13. A system of claim 2 further comprising a message replicating arbiter that uses routing information to move messages from one scratch space to another scratch space and that determines the routing tree between arbiters.

14. A message system for transmitting messages on a network between resources interconnected by the network, said message system comprising:

an asynchronous peer-to-peer arbiter resident in each of the resources for sending arbiter messages to other arbiters of other resources via the network asynchronously peer-to-peer and for receiving arbiter messages from other arbiters of other resources via the network asynchronously peer-to-peer, each said arbiter reviewing and processing the messages independently from other arbiters so that the resources communicate directly with each other via the arbiters without the need for a central master control system including controlling logic, a state control object, or a message locking system and without the need for a gateway for controlling and processing the messages as the messages are transmitted between resources;

wherein the arbiters include independent task arbiters operating across the network, said independent task arbiters including destination arbiters which receive arbiter messages addressed to them, which determine whether any necessary data or programs are available for executing a controlled process in the received message and which execute the controlled process in the received message when any necessary data or programs are available.

15. A message system of claim 14 wherein the network includes a distributed computing environment interconnecting systems using different operating systems and networking systems and wherein the arbiter message comprises ASCII text files for the transmission of instructions between resources via their arbiters.

16. An inter process peer to peer messaging system for integrating a plurality of networked resources, some of which employ operating systems which are incompatible with each other, said system comprising:

an asynchronous peer-to-peer arbiter message originator associated with each of the resources for providing independently of other arbiter messages and independently of a central master control system an independent arbiter message to be sent to the other resources of the network asynchronously peer-to-peer, the arbiter message instructing one of the other resources to execute one or more of the following; remote program execution, data transport, message communication, status communication, arbiter identification, data encryption, message encryption, and relocation of computer resources;

an asynchronous peer-to-peer message arbiter receiver associated with each resource for receiving independently of other arbiter messages and independently of a central master control system the arbiter messages from the other resources of the network asynchronously peer-to-peer and for independently responding to the received arbiter message by executing one or more of the following: retransmitting the arbiter message to another one of the resources; and deciphering, interpreting and executing the received arbiter message wherein the arbiter message originator and the arbiter message receiver communicate between their respective resources via their arbiters without the need for a master controlling program and without the need for a gateway for controlling and processing the messages as the messages are transmitted between resources;

wherein the arbiters include independent task arbiters operating across the network, said independent task arbiters including destination arbiters which receive arbiter messages addressed to them, which determine whether any necessary data or programs are available for executing a controlled process in the received message and which execute the controlled process in the received message when any necessary data or programs are available.

17. A messaging system of claim 16 wherein the network includes a distributed computing environment interconnecting systems using different operating systems and networking systems and wherein the arbiter message comprises ASCII text files for the transmission of instructions between resources via their arbiters.

18. An inter process peer to peer messaging process for integrating a plurality of networked resources, some of which employ operating systems which are incompatible with each other, said process comprising the steps of:

transmitting independently of other arbiters and independently of a central master control system an asynchronous peer-to-peer arbiter message from one resource to the other resources of the network asynchronously peer-to-peer, the arbiter message instructing one of the other resources to execute one or more of the following: remote program execution, data transport, message communication, status communication, arbiter identification, data encryption and message encryption and relocation of computer resources; and receiving independently of other arbiters and independently of a central master control system the arbiter messages from the other resources of the network asynchronously peer-to-peer and for independently responding to the received arbiter message by executing one or more of the following: retransmitting the arbiter message to another one of the resources; and interpreting and executing the received arbiter message wherein the actual communication between their respective resources is accomplished via their arbiters without the need for a master controlling program and without the need for a gateway for controlling and processing the messages as the messages are transmitted between resources wherein the resources originate messages of text files containing a digital signature and wherein the resources identify the system identity of messages from the text file.

19. A messaging process of claim 18 wherein the network includes a distributed computing environment interconnecting systems using different operating systems and networking systems and wherein the arbiter message comprises ASCII text files for the transmission of instructions between resources via their arbiters.

20. The process of claim 19 wherein the arbiter messages comprise ASCII text files and wherein the resources receiving said files via their arbiters identify the identity of the arbiter messages from their text file.

* * * * *